US012670205B2

(12) United States Patent
Pope et al.

(10) Patent No.: US 12,670,205 B2
(45) Date of Patent: Jun. 30, 2026

(54) METHOD FOR CITATION IDENTIFICATION

(71) Applicant: CiteAB Limited, Bath (GB)

(72) Inventors: Adam Pope, Bath (GB); Robert Willison, Bath (GB); Matthew Helsby, Bath (GB)

(73) Assignee: CiteAB Limited, Bath (GB)

( * ) Notice: Subject to any disclaimer, the term of this patent is extended or adjusted under 35 U.S.C. 154(b) by 258 days.

(21) Appl. No.: 18/363,400

(22) Filed: Aug. 1, 2023

(65) Prior Publication Data

US 2024/0045897 A1 Feb. 8, 2024

(30) Foreign Application Priority Data

Aug. 8, 2022 (GB) ...................................... 2211521

(51) Int. Cl.
| | |
|---|---|
| *G06F 16/38* | (2019.01) |
| *G06F 16/21* | (2019.01) |
| *G06F 16/2457* | (2019.01) |
| *G06F 16/25* | (2019.01) |
| *G06F 40/284* | (2020.01) |
| *G06F 40/295* | (2020.01) |

(52) U.S. Cl.
CPC ............ *G06F 16/382* (2019.01); *G06F 16/21* (2019.01); *G06F 16/24578* (2019.01); *G06F 16/25* (2019.01); *G06F 40/284* (2020.01); *G06F 40/295* (2020.01)

(58) Field of Classification Search
None
See application file for complete search history.

(56) References Cited

U.S. PATENT DOCUMENTS

| | | | | |
|---|---|---|---|---|
| 6,154,738 A | * | 11/2000 | Call ..................... | G06Q 20/208 |
| | | | | 715/239 |
| 10,009,372 B2 | * | 6/2018 | Valgenti .............. | H04L 63/1425 |
| 10,762,511 B1 | * | 9/2020 | Pope .................... | G06Q 30/014 |
| 11,461,407 B1 | * | 10/2022 | Schafer ................. | G06F 40/177 |
| 11,568,423 B2 | * | 1/2023 | Miller ................... | G06Q 50/18 |

(Continued)

OTHER PUBLICATIONS

Helsby et al. "CiteAb: a searchable antibody database that ranks antibodies by the number of times they have been cited." BMC Cell Biol. Feb. 14, 2014;15:6. 12 pages.

(Continued)

*Primary Examiner* — Jesse S Pullias
(74) *Attorney, Agent, or Firm* — Leason Ellis LLP

(57) ABSTRACT

A computer-implemented method for identifying a product citation in a document, the method comprising searching, in the document, for an entity identifier corresponding to an entity and, if an instance of the entity identifier is detected in the document, determining a portion of the document around the instance of the entity identifier as a target text, wherein the entity is associated with a product catalogue, the product catalogue comprising a plurality of product identifiers; applying a first regular expression to the target text, wherein the first regular expression is configured to match one or more of the plurality of product identifiers; and if a product identifier from the plurality of product identifiers is determined to be cited in the target text, adding an entry to a citation database linking the document and the product identifier.

17 Claims, 6 Drawing Sheets

(56)     References Cited

U.S. PATENT DOCUMENTS

| 2002/0007370 | A1* | 1/2002 | Brown | ............... | G06Q 30/0207 |
| | | | | | 705/14.1 |
| 2005/0267790 | A1* | 12/2005 | Skalsky | ............... | G06Q 20/108 |
| | | | | | 705/70 |
| 2006/0271531 | A1* | 11/2006 | O'Clair | ............. | G06Q 30/0205 |
| | | | | | 707/999.005 |
| 2012/0185478 | A1* | 7/2012 | Topham | ................ | G06F 16/313 |
| | | | | | 707/E17.046 |
| 2018/0232443 | A1* | 8/2018 | Delgo | .................... | G06F 16/35 |
| 2022/0027418 | A1* | 1/2022 | Gupta | ................... | G06F 16/906 |

OTHER PUBLICATIONS

No Author Listed, "The open group base specifications." Chapter 9.
IEEE Std. 1003.1. The Open Group 2018; 7: 14 pages.

* cited by examiner

100

102 — Search document for entity identifier

104 — Determine target text

106 — Apply first regular expression to target text

108 — Determine if any tokens matching the first regular expression correspond to product identifiers 110 — Add entry to citation database

212

300

302

Determine set of
prefixes having
length *n* for product
identifiers

*n+1*

304

Generate prefix
regular expressions
for set of prefixes

306

Apply prefix regular
expressions to
tokens from target
text

308

Keep only prefix
regular expressions
that return a match

402

Determine risk factor for
the product identifier

400

Risk factor
identified

No risk factor
identified

404

406

Generate third
regular expression
having identifier
component and
context component Generate third
regular expression
for the product
identifier

408

Apply third regular
expression to target text

METHOD FOR CITATION IDENTIFICATION

FIELD OF THE INVENTION

The present invention provides a computer-implemented method and system for identifying a product citation in a document. For example, the method may be used for identifying citations of a product from a supplier's catalogue in a document.

BACKGROUND

In many fields of scientific research, it is necessary to source a product (e.g. a consumable) for use in an application (e.g. experiment). Often, a given type of product may be available from a variety of different suppliers. However, product quality may vary across suppliers, and products from different suppliers may not always be suitable for the same applications. This may make finding and obtaining a product for use in a given application challenging.

For example, research antibodies are products which are used by scientists working in fields such as cell biology, immunology, neuroscience and cancer research to name a few. Researchers have found that antibody quality may be an issue, and that it is important to find well-validated antibodies for use in their experiments. The selection of an antibody is further complicated by the fact that they are used for a wide variety of applications (e.g. western blotting, flow cytometry, ELISA, immunoprecipitation, chromatin immunoprecipitation, immunochemistry), however suitability of an antibody for one application does not guarantee that it will provide good performance with another application.

One approach for finding products for use in an application is by performing a standard online search (e.g. using the Google search engine). However, the results of such a search may be dependent on many factors which do not directly relate to product quality. For example, such a search may return a supplier which has the best search engine optimisation, which does not necessarily correlate with the quality of their products. An alternative approach may be to use a specialised database which rank products based on various commercial criteria or user reviews.

The inventors have found that a more reliable approach for finding a suitable product for an application of interest is by finding a publication which cites use of a product in that application. In particular, if the use of the product is cited in a peer-reviewed publication, then this may be a good indicator of suitability of the product for that application. An example of this approach is the CiteAb database, which is a searchable antibody database that ranks antibodies by the number of times they have been cited in peer-reviewed journal articles. Thus, a user may easily identify an antibody which is most commonly used for a given application, based on the number of times it is cited in journal articles. The article "CiteAb: a searchable antibody database that ranks antibodies by the number of times they have been cited" (Helsby et al., BMC Cell Biology 2014, 15:6). However, a difficulty associated with creating a database that ranks products by number of citations, such as the CiteAb database, is that this involves reviewing a large number of documents (e.g. journal articles), in order to find citations relating to a large number of products.

Thus, generating a database that provides a user with the ability to search for specific products has remained a technical challenge.

SUMMARY OF THE INVENTION

At its most general, the present invention provides a method for finding a citation of a product in a document. The method may thus be used to construct a citation database, where products are linked to documents in which they have been cited. The method involves a two-stage process, where in the first stage a portion of the document is identified as target text for further analysis. The target text corresponds to a portion of the document in which an entity name (e.g. a supplier name) is cited. Then, in the second stage, a regular expression configured to match products in a product catalogue associated with that entity (e.g. supplier) is applied to the target text, in order to determine if a product from the product catalogue is cited in the target text. The inventors have found that this two-stage process may significantly reduce an amount of time and computing resources that are required to search a document for citations of products from a product catalogue. In particular, by first narrowing down the area of search to the target text, and then by applying a regular expression to the target text, it may be possible to rapidly determine whether any products from a product catalogue are cited in the document. In contrast, conventional searching techniques which involve individually searching the document for each product in a product catalogue may result in long search times, and become impractical for large product catalogues.

Furthermore, it will be appreciated that the described methods can be carried out without human input or intervention. While existing approaches make it possible to extract the relevant information from documents, doing so requires extensive and cost-prohibitive labour. The systems, methods and computer implemented processes described herein allow for automatic analysis of entire corpuses of documents and the generation of customizable datasets and databases. Such approaches represent specific technical improvements in the performance and accuracy of citation generation systems. Furthermore, the described approaches provide specific practical implementations to generate electronic databases.

According to a first aspect of the invention, there is provided a computer-implemented method for identifying a product citation in a document, the method comprising: searching, in the document, for an entity identifier corresponding to an entity and, if an instance of the entity identifier is detected in the document, determining a portion of the document around the instance of the entity identifier as a target text, wherein the entity is associated with a product catalogue, the product catalogue comprising a plurality of product identifiers; applying a first regular expression to the target text, wherein the first regular expression is configured to match one or more of the plurality of product identifiers; and if a product identifier from the plurality of product identifiers is determined to be cited in the target text, adding an entry to a citation database linking the document and the product identifier. The method of the first aspect may be implemented by any suitable computer system or a network of computer systems.

The document may be any document of interest. For example, the document may be an article, such as a journal article, or a magazine article. The document may comprise a peer-reviewed publication. The document may be stored in a memory of the system, e.g. in a document database.

Initially, the method searches for an entity identifier corresponding to an entity in the document. The entity may, for example, be a supplier or manufacturer of products. The entity identifier may, for example, be a name, code or other identifier associated with that entity. Thus, the entity identifier may comprise a string of characters used to identify the entity.

The entity is associated with a product catalogue. The product catalogue may correspond to a list of products available from that entity (e.g. supplier or manufacturer). The product catalogue includes a plurality of product identifiers. Each product identifier may correspond to a respective product. For example, each product identifier may comprise a name and/or code for identifying a product. In other words, each product identifier may comprise a string of characters used to identify a respective product from that entity. The product catalogue may be stored in a memory of the system, e.g. in a catalogue database.

In some cases, the product catalogue can include over 10 million product identifiers.

In some cases, the method may include a step of obtaining the product catalogue. The product catalogue may be obtained via any suitable technique. For example, the product catalogue may be obtained (e.g. downloaded) from a website associated with the entity, or it may be otherwise provided by the entity.

Herein, a product may refer for example to an item or consumable. The product may be manufactured and/or supplied by the entity. In a specific example, a product may refer to an antibody, i.e. the product catalogue may be a catalogue of antibodies.

Any suitable technique may be used for searching for the entity identifier in the document, such as a full-text search.

If an instance of the entity identifier is found in the document, then a portion of the document around the instance of the entity identifier is determined as target text. The target text may comprise a predetermined amount of text on either side of the instance of the entity identifier. This may serve to ensure that any mention of a product identifier is included in the target text. For example, the target text may include 1000 characters (or fewer) from the document that precede the instance of the entity identifier and 1000 characters (or fewer) from the document after the instance of the entity identifier. Of course, other predetermined numbers of characters may be used. Additionally or alternatively, the target text may include a paragraph of text, a line of text, or some other portion of text containing the instance of the entity identifier. For example, the target text may be delimited by a start and an end of a paragraph (or line) of text containing the instance of the entity identifier.

Once the target text has been determined, a first regular expression is applied to the target text. The first regular expression is configured to match one or more of the plurality of product identifiers from the product catalogue. In this manner, if the target text includes any of the one or more of the plurality of product identifiers, then a match with the regular expression will be returned. Applying the first regular expression to the target text may comprise comparing character strings in the target text with the first regular expression, to determine if the character strings match the regular expression. The first regular expression may be applied to the target text using a suitable search engine.

By applying the first regular expression to only the target text (as opposed to the whole document), the amount of text in which product identifiers are searched for may be greatly reduced. This may speed up the process of finding product identifiers in the document. Moreover, the scope of the search for product identifiers may be limited to only product identifiers from the product catalogue associated with the entity identifier that was previously found in the document. Thus, once an entity identifier is found in the document, the subsequent steps of the method only look for product identifiers associated with that entity. This may lead to efficient locating of product identifiers in the document.

Advantageously, a regular expression may define a pattern that matches multiple product identifiers. Thus, using the first regular expression to search the target text for the one or more product identifiers may avoid having to search the target text for each of the product identifiers individually. In this manner, performing a single search on the target text with the first regular expression may provide an indication of whether any of the one or more product identifiers is cited in the target text. A further benefit of using a regular expression for this search is that regular expressions can be configured to take into account different writing styles. In one arrangement, the use of regular expression, whether automatically or manually generated, improves accuracy and reliability with which product identifiers can be found in the target text relative to existing systems.

The inventors have found that regular expressions, in one or more specific implementations, are particularly suited to search for product identifiers from a product catalogue, as product identifiers may often have a recognisable pattern of characters. For example, a particular supplier may have product identifiers with an alphabetical prefix followed by a numerical code. Regular expressions can be configured to recognise such patterns of characters, without having to list each individual product identifier. Thus, the first regular expression may include a component that is configured to match a character pattern of one or more of the plurality of product identifiers. In some cases, the product catalogue may include product identifiers having a variety of different character patterns. Then, the first regular expression may include a component configured to match each of the character patterns.

The first regular expression may include one or more components. At its simplest, the first regular expression may include a respective component for each of the one or more product identifiers. However, as noted above, multiple product identifiers in the product catalogue may follow a similar character pattern, such that the multiple product identifiers can be matched by a single component of the first regular expression. Thus, the first regular expression may comprise a component that is configured to match multiple product identifiers from the product catalogue.

As is known in the art, a regular expression is a sequence of characters that defines a search pattern. A regular expression may include a combination of metacharacters (i.e. characters having a special meaning) and regular characters (i.e. characters having a literal meaning). For example, 'The Open Group Base Specifications', Issue 7, 2018 edition, IEEE Std 1003.1, Chapter 9, herein incorporated by reference as if presented in its entirety, provides an overview of regular expressions.

In a preferred embodiment, the first regular expression may be configured to match all of the plurality of product identifiers in the product catalogue. In this manner, if the target text includes any of the plurality of product identifiers, then a match with the regular expression may be returned. Thus, by applying a single regular expression to the target text, it is possible to determine if any of the plurality of product identifiers is cited in the target text, which may greatly reduce a search time for the product catalogue.

However, in some cases the first regular expression may be configured to only match a single product identifier from the product catalogue. For example, a respective first regular expression may be used for each product identifier in the product catalogue. This may be the case where the product identifiers in the product catalogue do not follow any particular character pattern, in which case it may not be practical to cover all of the product identifiers with a single regular expression. Then, the method may include applying to the target text a respective first regular expression for each product identifier in the product catalogue, to determine which (if any) of the product identifiers is cited in the target text.

Following the application of the first regular expression to the target text, the method may return one or more tokens that match the first regular expression. Each of the one or more tokens may correspond to a string of characters from the target text that matches the first regular expression. The tokens can then be analysed to determine if any of them corresponds to a product identifier from the product catalogue. If a token corresponds to one of the product identifiers from the product catalogue, then that product identifier may be determined to be cited in the target text. A citation is then added to the citation database, which links the document and the cited product identifier.

The citation database may be configured to store citations of product identifiers. In particular, the citation database may associate product identifiers from the product catalogue with documents in which they were cited. In some cases, the citation database may associate product identifiers with target texts in which they were cited. In this manner, a user may readily find the relevant passage of a document in which a product identifier was cited. The citation database may be used, for example, to rank products in accordance with the number of times they have been cited. The citation database may be configured to collect citations of product identifiers associated with product catalogues from multiple different entities (e.g. suppliers or manufacturers), so that product citations can be compared across different entities.

The citation database may be part of the computer system used to implement the method. For example, the citation database may be implemented by a computer server, e.g. a cloud server.

The searching for the entity identifier in the document may comprise applying a second regular expression to the document. In one or more specific implementations of the system, process or method described, applying the second regular expression serves to improve a reliability and accuracy with which the entity identifier can be found in the document. Indeed, as noted above, a regular expression can be configured to account for different writing styles. For example, an author of a document may write an entity's name with different punctuation compared with the entity's official name. Using the second regular expression for searching for the entity identifier, it may be possible to take into account the differences in punctuation, such that the entity identifier is not missed in the document. Therefore, not only is the described approach more accurate that existing approaches, but the use of a second regular expression improves the speed of searching for the entity identifier relative to existing systems.

Applying the second regular expression to the document may comprise comparing strings of characters in the document with the second regular expression, to determine if the strings of characters match the second regular expression. The second regular expression may be applied to the document using any suitable search engine. If a string of characters in the document matches the second regular expression, then that string of characters may be determined as the instance of an entity identifier, and is used to define the target text as discussed above.

In some cases, there may be multiple entity identifiers corresponding to the entity, and the second regular expression may be configured to match all of the multiple entity identifiers. Thus, using a single regular expression, it is possible to determine if any of the entity's identifiers are cited in a document, without having to individually search for each entity identifier. This may be useful where an entity is referred to using different names or synonyms. For example, an entity may have an 'official' name, but may also be referred to using an acronym or a shortened version of its 'official' name. Accordingly, the second regular expression may serve to ensure detection of any of the entity's names in the document, whilst still only performing a single search on the document.

In some cases, there may be a plurality of entities, each of which is associated with a respective entity identifier. Each entity (e.g. supplier or manufacturer) may be associated with a respective product catalogue, each product catalogue comprising a respective plurality of product identifiers. The initial searching step may then comprise searching, in the document, for entity identifiers associated with each entity. If an instance of the entity identifier associated with an entity is detected in the document, then the next step uses a first regular expression which is configured to match one or more of the plurality of product identifiers from the product catalogue associated with that entity. In other words, the first regular expression used depends on the entity identifier included in the target text. In this manner, only product identifiers corresponding to the entity that is identified in the target text are searched for in the target text. This may significantly narrow the scope of the search performed on the target text, thus minimising a search time and processing power required by the search.

Thus, one embodiment provides a computer-implemented method for identifying a product citation in a document, wherein there is a plurality of entities, each of which is associated with a respective entity identifier, each entity being associated with a respective product catalogue comprising a respective plurality of product identifiers, the method comprising: searching, in the document, for the entity identifier corresponding to each entity and, if an instance of the entity identifier for one of the plurality of entities is detected in the document, determining a portion of the document around the instance of the entity identifier as a target text; applying a first regular expression to the target text, wherein the first regular expression is configured to match one or more of the plurality of product identifiers from the product catalogue associated with the entity whose entity identifier is in the target text; and if a product identifier from the plurality of product identifiers is determined to be cited in the target text, adding an entry to a citation database linking the document and the product identifier.

In line with the discussion above, the search for the entity identifier associated with each entity may be performed by applying a respective second regular expression to the document. Where an entity is associated with multiple entity identifiers, its corresponding second regular expression may be configured to match each of its multiple entity identifiers.

The method may further comprise generating, automatically without human input, the first regular expression.

In some cases, generating the first regular expression may comprise obtaining, from a memory, a regular expression code associated with the product catalogue, and basing a first component of the first regular expression on the obtained regular expression code. The regular expression code may be configured to match at least one of the product identifiers in the product catalogue. The regular expression code may correspond to a regular expression that was pre-computed for the product catalogue and stored in a memory. For example, the regular expression code may correspond to a first regular expression that was generated for the product catalogue in a previous iteration of the method.

In a further configuration, a suitably configured processor executes one or more code modules for automatically, or otherwise without human input, generating the first regular expression by obtaining a list of product codes from a product catalogue associated with a given entity. Using this list, the processor is further configured to generate one or more regular expressions that correspond to entries within the product catalogue. In a further arrangement, the number of generated regular expressions is less that the number of product codes provided for in the product list. The processor is then configured to store the generated regular expression values or provide those generated regular expression values as an input to a further process or function described herein.

Alternatively, the regular expression code may comprise a human-generated regular expression. For instance, where the product catalogue includes product identifiers having a clear character pattern, a human may write a regular expression code configured to match product identifiers having that character pattern. Basing the first component of the first regular expression on the regular expression code may mean that the first component includes the regular expression code.

In some cases, automatically generating the first regular expression comprises generating, using at least one of the plurality of product identifiers, a second component of the first regular expression, the second component being configured to match the at least one (e.g. one, two or more) product identifiers. In other words, the second component is generated to match at least one of the plurality of product identifiers. The second component may be generated using any suitable technique. For example, the second component may be generated using a regular expression generator, which takes the at least one product identifiers as an input and which outputs a regular expression configured to match the at least one product identifiers. As noted above, multiple product identifiers within the product catalogue may follow a same character pattern. Thus, where the at least one product identifiers have a given character pattern, the second component of the first regular expression may be configured to match that character pattern.

Where the first regular expression includes the first component based on the regular expression code, the second component of the first regular expression may be generated for at least one product identifiers that were determined to not match the regular expression code. In this manner, product identifiers that are not matched by the regular expression code would be matched by the second component of the first regular expression. This may serve to ensure that the first regular expression matches all of the product identifiers in the product catalogue. This may also reduce an amount of processing which is required to generate the first regular expression, as a regular expression component only needs to be generated for product identifiers which are not already matched by the pre-computed regular expression code.

Thus, the method may further comprise determining any of the plurality of product identifiers that do not match the regular expression code; and generating the second component of the first regular expression, the second component of the first regular expression being configured to match the product identifiers determined to not match the regular expression code.

Automatically generating the second component of the first regular expression may comprise parsing the at least one product identifiers into a tree, and traversing the tree to generate the second component. The inventors have found that parsing the product identifiers into a tree may facilitate generating a regular expression of the product identifiers. In particular, this may reduce an amount of processing required to generate the second component of the regular expression. This may also provide an optimised regular expression, which can be processed more rapidly by a search engine. The tree may be a prefix tree.

The tree may be a tree structure having a root node and a plurality of character nodes, each representing a character. The nodes in the tree structure may be connected by edges such that each path between the root node and a leaf node of the tree structure corresponds to a respective one of the at least one product identifiers.

The tree may be traversed, for example, by performing a recursive walk down the tree. This may result in an efficient pattern for matching the at least one product identifiers.

The method may further comprise storing the first regular expression in a memory. Thus, after the first regular expression is generated, it may be stored in a memory of the system. This enables the first regular expression to be used again when searching for product identifiers from the product catalogue in another document. This avoids having to generate the first regular expression each time a new document is analysed. Therefore, once the first regular expression has been generated for a product catalogue, an amount of processing required for searching further documents may be significantly reduced. For example, a previously stored first regular expression may be retrieved and used as the first component of a new first regular expression, as discussed above.

The method may comprise: in response to applying the first regular expression to the target text, identifying, using one or more suitably configured processors, one or more tokens from the target text that match the first regular expression; and determining, using the one or more suitably configured processor, if any of the one or more tokens corresponds to a product identifier from the product catalogue and, if so, which product identifier. As mentioned above, a token may correspond to a string of characters in the target text that matches the first regular expression.

Determining if any of the one or more tokens corresponds to a product identifier may comprise an iterative process, each iteration of the iterative process can include providing a processor configured by code executing therein for: determining a set of prefixes for the plurality of product identifiers, each prefix having a predetermined number of characters; generating a set of prefix regular expressions corresponding to the set of prefixes; applying the prefix regular expressions to the one or more tokens, and keeping only the prefix regular expressions that return a match; wherein for each subsequent iteration, the predetermined number of characters is increased by one, and the set of prefixes is determined to include only prefixes that match prefix regular expression kept in the previous iteration; and wherein, a token is determined to correspond to a product identifier if a prefix regular expression matches the token, and if the predetermined number of characters corresponds to a number of characters in the product identifier. The inventors have found that such an iterative process may enable efficient matching of tokens to product identifiers, such that an amount of time taken to identify a product citation in the document may be significantly reduced.

The iterative process described above effectively compares the tokens to prefixes of increasing length, until full product identifiers are matched. Thus, with each iteration of the process, the range of product identifiers which is considered is progressively restricted. This avoids having to compare the tokens with each full product identifier in the product catalogue, which would be a much more processing intensive process, particularly with large product catalogues.

Herein, a 'prefix' may refer to a string of characters at the beginning of a product identifier and having the predetermined number of characters. The set of prefix regular expressions may include a regular expression configured to match each prefix in the set of prefixes. As an example, the predetermined number may be two in the first iteration of the iterative process. Then, the set of prefixes would include all of the two-character prefixes of product identifiers in the product catalogue. In the next iteration, the predetermined number would be increased to three, and with the set of prefixes including all three-character prefixes of the product identifiers which match the prefix regular expressions kept in the previous iteration.

The set of prefixes in each iteration of the iterative process may be determined based on the product catalogue, e.g. by analysing the product catalogue to determine all of the prefixes of the predetermined length. Alternatively, sets of prefixes may have been pre-computed for the product catalogue, in which case the sets of prefixes can be looked up in each iteration. This may avoid having to query the product catalogue at each iteration, thus speeding up the process.

The method may comprise storing (e.g. in a memory of the system) the set of prefixes and/or the set of prefix regular expressions generated in each iteration of the iterative process. In this manner, the set of prefixes and/or the set of prefix regular expressions can be subsequently re-used, without having to directly query the product catalogue. Such reuse, in turn, contributes to the overall improved efficiency, speed and accuracy of the described system relative to existing search systems.

The method may further comprise, for each of the one or more tokens determined to correspond to a product identifier: generating a third regular expression configured to match the corresponding product identifier; applying the third regular expression to the target text; and if a match with the third regular expression is found in the target text, determining that the corresponding product identifier is cited in the target text. This may act as a verification step, to ensure that a token has been correctly determined to correspond to a product identifier. Accordingly, an accuracy with which product citations are determined is improved in specific implementations. Whereas the first regular expression may be configured to match multiple product identifiers from the product catalogue, the third regular expression may be configured to match only a single one of the product identifiers. In this manner, it can be confirmed that the product identifier in question is in fact cited in the target text.

The third regular expression may be configured to match different writing styles of the product identifier. For example, an author of a document may write a product identifier with different punctuation compared with the how it is written in the product catalogue. The third regular expression may therefore be constructed by permuting the product identifier, so that the regular expression matches the product identifier in different writing styles (e.g. with different forms of punctuation).

The third regular expression may be configured to match word boundaries, to avoid matching sub-strings of another product identifier.

The third regular expression may comprise an identifier component configured to match the product identifier, and a context component that is configured to match a predetermined context. This may serve to ensure that a string (i.e. token) matched by the third regular expression in fact corresponds to a product identifier. In particular, the context component of the third regular expression may ensure that only a token cited in the predetermined context can be determined as a product identifier. In other words, the third regular expression is configured to only return a match if a string of text in the target text matches the combination of identifier component and context component provided in the third regular expression, e.g. if a first part of the string matches the identifier component and a second part of the string matches the context component.

The inventors have found that where a product identifier is cited in a document, it is often accompanied by certain pieces of text which act as 'context' for the product identifier. For example, text such as 'catalogue number', 'cat #' or similar may precede a product identifier in the document. Similarly, text indicative of a pack size may often follow a product identifier and thus act as context for the product identifier. Accordingly, by matching a predetermined context in addition to the product identifier, it is possible to ensure that a matched token actually corresponds to a product identifier. As a result, the described approach improves the accuracy with which product citations in the target text are determined relative to existing citation generation approaches.

The identifier component may be configured as discussed above in relation to the third regular expression, e.g. it may be configured to match a single product identifier, including different writing styles of the product identifier. The predetermined context may comprise one or more predetermined strings of characters, which may typically be cited together with a product identifier in a document. Thus, the context component may be configured to match one or more predetermined strings of characters. The third regular expression may be configured such that the identifier component and the context component are arranged to match adjacent strings of characters, e.g. so that a matched product identifier is adjacent to a matched context in the target text.

In some cases, the method may further comprise for each of the one or more tokens determined to correspond to a product identifier: determining a risk factor for the corresponding product identifier, wherein the risk factor is associated with a risk of wrongly identifying the product identifier in the target text; and if a risk factor is identified, generating the third regular expression such that it includes an identifier component configured to match the product identifier, and a context component that is configured to match a predetermined context. In this manner, if it is determined that there is a risk of misidentifying the product identifier in the target text, then a context component may be included in the third regular expression, to avoid misidentifying the product identifier. This improves the accuracy with which product citations are determined. The third regular expression including an identifier component and a context component may be configured as discussed above.

As an example, if a product identifier is a numeric code, then there may be a risk that it could be confused with other numeric codes used in the document and which are not product identifiers. For example, a four-digit numeric code cited in a document could correspond to a date rather than a product identifier. In such a case, a risk factor may be identified, such that a context component may be included in the third regular expression. The risk factor may be determined based on the product identifier in question, and its likelihood of being confused with text in the document that is not a product identifier. A set of predetermined rules, taking the product identifier as an input, may be used for determining the risk factor.

Herein use of the terms 'first', 'second', or 'third' is intended to name or identify features, and to facilitate distinguishing different features from one another. These terms are not intended imply that a specific number of corresponding features must be used, or any specific ordering of the corresponding features, unless context dictates otherwise. For example, reference to a 'first', 'second', or 'third' regular expression in this specification is merely meant to identify the relevant regular expression, e.g. to facilitate distinguishing the first regular expression from other regular expressions that may be used as part of the method. In particular, reference to the 'first' regular expression does not imply that the method must employ further regular expressions, or that the first regular expression must be the first one used in the method.

According to a second aspect of the invention, there is provided a computer-implemented system comprising a processor and a memory storing instructions which, when executed by the processor, cause the processor to carry out a method according to the first aspect of the invention. The computer-implemented system may comprise any suitable computer system and/or network of computer systems which are configured to implement a method of the first aspect of the invention.

According to a third aspect of the invention, there is provided a computer-readable storage medium comprising instructions stored therein which, when executed by a processor, cause the processor to carry out a method according to the first aspect of the invention.

According to a fourth aspect of the invention, there is provided a computer-implemented system comprising a processor and a memory storing instructions which, when executed by the processor, cause the processor to access a corpus of documents and evaluate the subject matter of each document within the corpus of documents according to the first aspect of the invention so as to automatically generate at least one searchable database that is configured to allow a search query to be executed over the contents of the database for a given product or product supplier. Wherein, the execution of the search query causes the generation of an index indicating each document of the corpus of documents that contains reference to the contents of the search query.

The corpus of documents can include at least 10 million documents. In some cases, the corpus of documents can include 12 million documents or more.

In this manner, when a user uses the search engine to search for a particular product, the search engine returns a ranked list of one or more product identifiers from the citation database. The one or more product identifiers are ranked based the number of documents linked with each of the one or more product identifiers. In other words, the one or more product identifiers are ranked based on a number of times they are cited by documents in the corpus of documents. As a result, the user can readily identify the most commonly cited product identifier. This may in turn facilitate identifying and selecting a product by the user. For example, as discussed above, the number of times a product is cited in literature may be indicative of a quality and reliability of the product.

As noted, the systems, methods and computer implemented processes described herein are implemented to reduce the amount of time necessary to identify relevant subject matter within one or more documents. Specifically, in existing citation generation approaches, the entire document is searched for product codes or other responsive content. In the presently described approaches, only portion of the document is evaluated based on one or more automatically generated regular expressions or other pattern matching queries. As a result, more documents of interest can be processed in the same amount of time originally allotted to a single document search. Thus, the throughput, efficiency and accuracy in citation identification is improved.

BRIEF DESCRIPTION OF THE DRAWINGS

Embodiments of the invention will now be described by way of example with reference to the accompanying drawings, in which.

DETAILED DESCRIPTION

Further Options and Preferences

Figure 1:
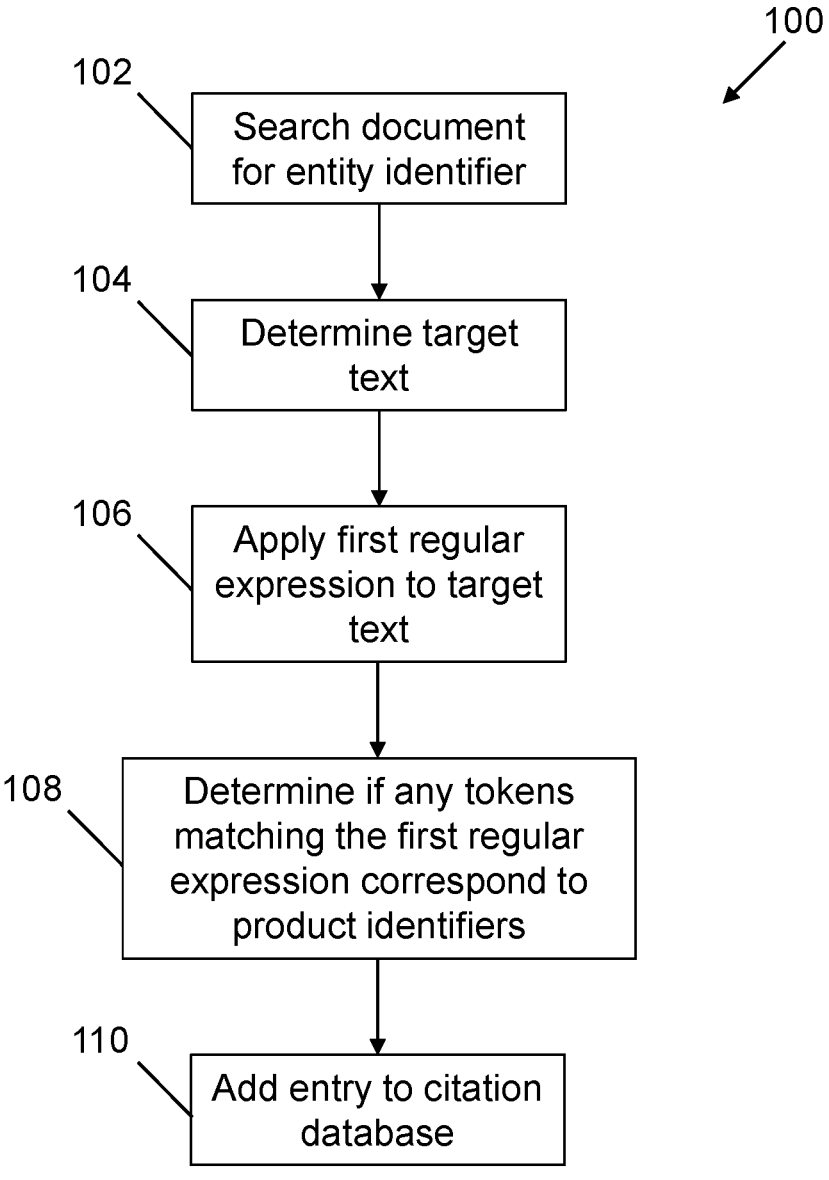
FIG. 1 is schematic diagram illustrating a computer-implemented method according to an embodiment of the invention.

FIG. 1 is a schematic diagram illustrating a computer-implemented method 100 according to an embodiment of the invention. The method 100 may be implemented using any suitable computer system or network of computer systems. An example computer system for implementing method 100 is described below in relation to FIG. 5. The purpose of the method 100 is to identify any citations of products from a product catalogue in a document, such as a journal article. The product catalogue is associated with an entity (e.g. a supplier or a manufacturer), and includes a plurality of product identifiers identifying products which may be available from that entity. The entity is associated with one or more entity identifiers which are used for identifying that entity. For example, an entity be identified by an official name (e.g. company name), as well as various other names including acronyms, synonyms or other identification codes.

It will be appreciated and understood that the "document" described herein can be an electronic or digital file that contains text and optionally, images, tables, graphs, embedded links, video portions or other content. The electronic or digital document can have any known or understood file type, such as .doc, .txt, .rtf, .pdf, .html, xml, and .json. The processors or computers described herein are configured to access such file types and evaluate the contents thereof.

In a first step 102, the method 100 involves searching, using a computer or processor suitably configured by code executing therein, the document for the entity identifier(s) associated with the entity. This may be done by performing a full-text search on the document for the entity identifiers associated with the entity. In some embodiments, this may be implemented by applying a regular expression to the document, where the regular expression is configured to match any (e.g. all) of the entity identifiers associated with the entity. Herein, the regular expression which is used to search for the entity identifiers is referred to as a 'second' regular expression.

In some cases, there may be multiple entities (e.g. suppliers or manufacturers) of interest, each entity being associated with a respective product catalogue. In such a case, the step 102 may involve searching the document for entity identifiers associated with each of the multiple entities. Thus, a respective regular expression corresponding to each of the multiple entities may be applied to the document in step 102.

In a second step 104, if an instance of an entity identifier associated with the entity is detected in the document (e.g. if a string of characters in the text matches second regular expression), then a portion of the document including the instance of the entity identifier is determined as target text for further analysis. The target text includes a predetermined amount of text (e.g. a predetermined number of characters) on either side of the detected instance of the entity identifier. As an example, the target text may include 1000 characters (or fewer) on either side of the detected instance of the entity identifier.

In a third step 106, the method 100 involves applying a first regular expression to the target text. The first regular expression is configured to match one or more of the plurality of product identifiers in the product catalogue. Preferably, the first regular expression is configured to match all of the product identifiers in the product catalogue, so that only a single regular expression need be applied to the target text. In some cases, the first regular expression may be pre-computed for the product catalogue, in which case the first regular expression can simply be retrieved from a memory and applied to the target text. Alternatively, the first regular expression may be generated and/or updated as part of the method. An example process for generating the first regular expression is discussed in more detail below in relation to FIGS. 2a and 2b.

In the cases mentioned above where there are multiple entities of interest, the first regular expression is configured to match one or more of the plurality of product identifiers in the product catalogue associated with the entity whose entity identifier was detected in step 102. Thus, step 106 only searches for product identifiers corresponding to the entity whose entity identifier is in the target text.

In step 106, the first regular expression may be applied to the target text by a search engine, which searches the target text for strings of characters that match the first regular expression. If a string of characters in the target text is found to match the first regular expression, then a token corresponding to that string of characters is output. Thus, step 106 may result in one or more tokens to be output, each token corresponding to a respective string of characters in the target text that matches the first regular expression.

In step 108, the tokens output from step 106 (if any) are analysed to determine if any of them corresponds to one of the product identifiers in the product catalogue and, if so, to which product identifier. Indeed, as the first regular expression may match multiple product identifiers, it is necessary to determine which of the product identifiers corresponds to an identified token from the target text. An example implementation of step 108 is described in more detail below in relation to FIG. 3.

If a token output from step 106 is determined to correspond to one of the product identifiers, then in step 110 of the method 100, an entry is added to a citation database. The entry links the document with the cited product identifier, and may also further link the product identifier with the target text in which it was cited. Accordingly, by analysing multiple documents in accordance with the method 100, the citation database may be built up to include citations of product identifiers across the multiple documents. The citation database may associate product identifiers from the product catalogue with documents in which they were cited. This may, for example, enable products to be ranked in accordance with the number of times they have been cited, as well as facilitate rapid access to documents where they are cited. The citation database may store citation data for multiple entities, such that products from multiple entities can be ranked based on number of citations.

Figure 2A:
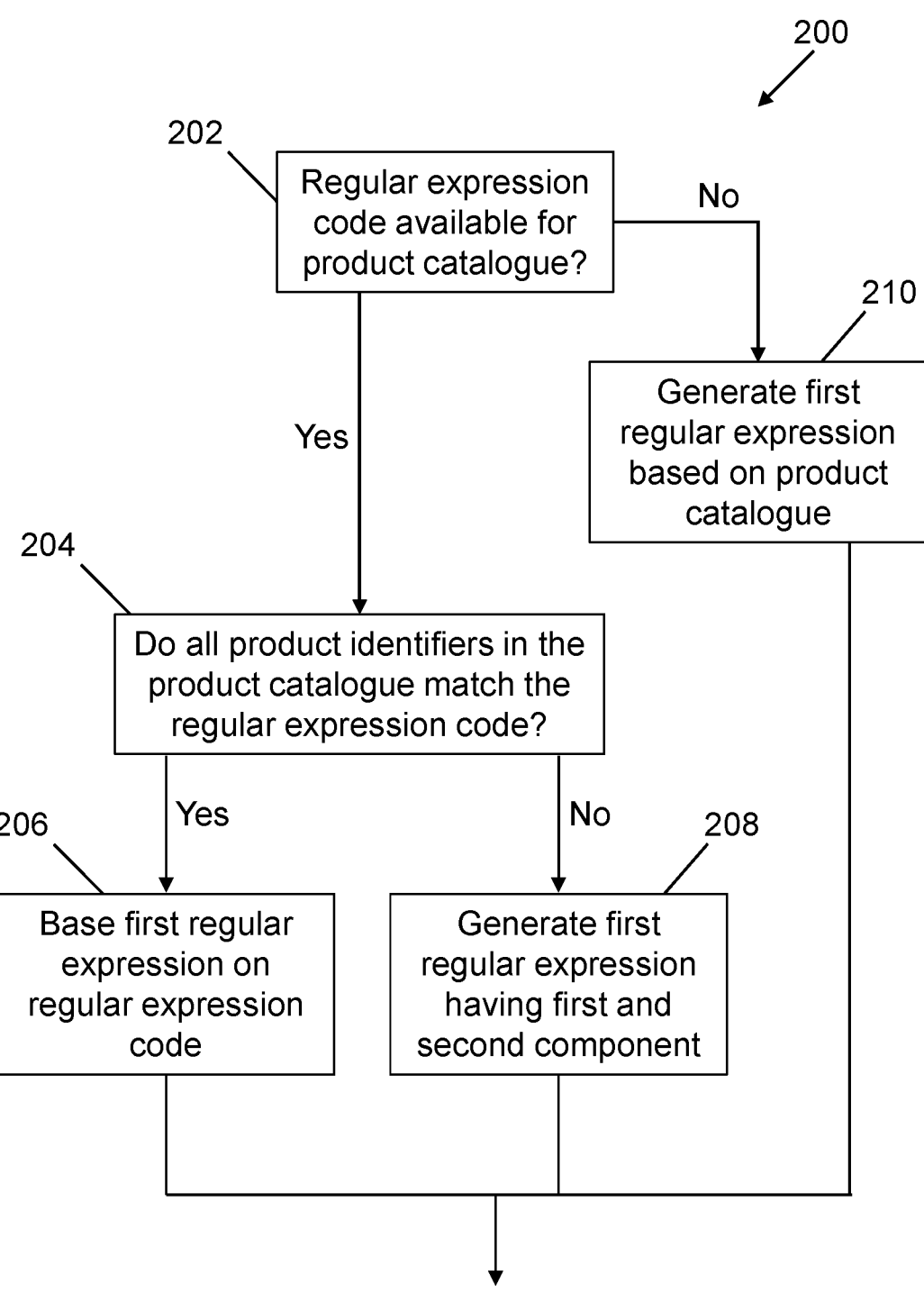
FIG. 2*a* is a schematic diagram illustrating a process that may be used as part of a method according to an embodiment of the invention.

FIG. 2a is a schematic diagram illustrating a method 200 for generating a first regular expression according to an embodiment of the invention. The method 200 may, for example, be performed between steps 102 and 106 shown in FIG. 1.

The method 200 involves, at step 202, determining whether a regular expression code is available for the relevant product catalogue. For example, there may be a regular expression database which is configured to store regular expression codes associated with various product catalogues. The regular expression codes may correspond to regular expressions that were pre-computed for the product catalogues, or computed as part of a previous iteration of the method 100. The regular expression codes stored in the database may additionally or alternatively include human-generated regular expressions. Thus, step 202 may involve searching the regular expression database for a regular expression code associated with the relevant product catalogue, i.e. corresponding to the entity whose entity identifier was found in step 102. For instance, after an instance of an entity identifier is found in step 102, step 202 may determine if a regular expression code corresponding to the entity whose entity identifier was found in step 102 is available.

If a regular expression code corresponding to the relevant product catalogue is found in step 202, then the regular expression code is retrieved and the method 200 moves on to step 204. Step 204 checks if any product identifiers in the product catalogue do not match the retrieved regular expression code. This may be achieved, for example, by comparing each of the product identifiers in the product catalogue with the regular expression code, to determine which (if any) of the product identifiers do not match the regular expression code.

If all product identifiers in the product catalogue match the regular expression code, then the method 200 moves on to step 206, in which the first regular expression is generated based on the retrieved regular expression code. For example, the regular expression code may be defined as the first regular expression, or the regular expression code may be included as part of the first regular expression. On the other hand, if the retrieved regular expression code does not match all of the product identifiers in the product catalogue, the method 200 moves on to step 208. In step 208, the first regular expression is generated to include a first component and a second component. The first component is based on the regular expression code, in a similar way to step 206. The second component is configured to match the remaining product identifiers, i.e. the product identifiers which are not matched by the regular expression code. In this manner, the first regular expression obtained from step 208 can match all of the product identifiers in the product catalogue. The second component of the first regular expression is generated using a regular expression generator. The regular expression generator is configured to take the remaining product identifiers (i.e. those which do not match the regular expression code) as an input, and to output a regular expression that matches all of the remaining product identifiers.

Returning to step 202, if no regular expression code is found for the product catalogue in the regular expression database, then the method 200 moves on to step 210. In step 210, the first regular expression is generated, by a suitably configured processor, based on the product catalogue, the first regular expression being configured to match all of the product identifiers in the product catalogue. This can be performed using a regular expression generator, which is configured to take the plurality of product identifiers in the product catalogue as an input, and to output the first regular expression. The regular expression generator used in step 210 may be the same (or have a similar configuration) as the one used in step 208.

Figure 2B:
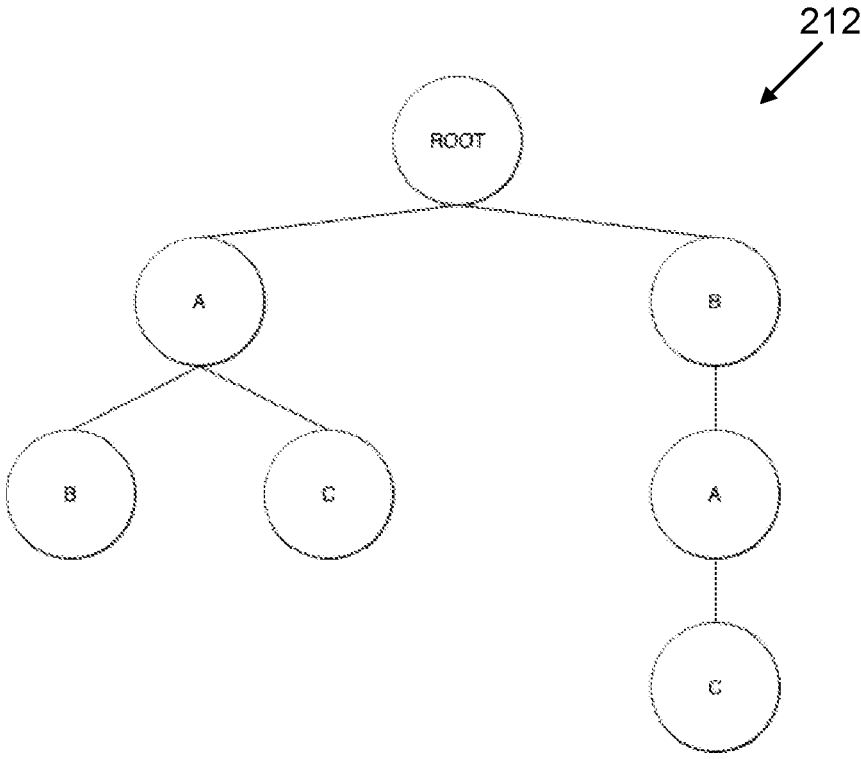
FIG. 2*b* is a diagram of a tree structure that may be produced as part of a method according to an embodiment of the invention.

An example implementation of a regular expression generator that can be used in steps 208 and 210 will now be described. The regular expression generator is implemented as one or more processors suitably configured to receive as an input the product identifiers for which a regular expression is to be generated. In the case of step 208, this includes all of the product identifiers of the product catalogue that do not match the regular expression code retrieved in step 202. In the case of step 210, this includes all the product identifiers in the product catalogue. The regular expression generator is then configured to parse the product identifiers into a tree (e.g. prefix tree), and traverse the tree to generate a regular expression that matches all of the product identifiers. The tree is constructed by iterating over the product identifiers and for each product identifier splitting it into single character tokens. The process then iterates over the tokens and builds a tree structure including a root node, and a plurality of character nodes, each corresponding to a character token. The root nodes and character nodes are connected by edges such that each path through the tree from the root node to a leaf node corresponds to a respective product identifier. Accordingly, by performing a recursive walk down the tree, it is possible to construct an efficient pattern for matching all of the product identifiers. For example, FIG. 2b shows a tree 212 which was constructed for the following list of product identifiers: AB, AC, BAC. Then, by performing a recursive walk down the tree, the following pattern for matching the product identifiers can be obtained: (A[BC]|BAC).

It should be noted that a tree may include terminal nodes, i.e. one or more nodes of the tree may be indicated as terminal nodes. For example, the tree 212 of FIG. 2b may correspond to a tree that was constructed for the following list of product identifiers: AB, AC, BA, BAC. In this case, the 'A' node on the right-hand side of the tree 212 may have an attribute to indicate that it is a terminal node. Then, by performing a recursive walk down the tree, the following pattern for matching the product identifiers can be obtained: (A[BC]|BAC?).

Accordingly, the method 200 outputs a first regular expression. The first regular expression obtained from the method 200 may then be applied to the target text in step 106 of the method 100, as discussed above. Regardless of whether the first regular expression is obtained from step 206, step 208 or step 210, the first regular expression is configured to match all of the product identifiers in the product catalogue. Following generation of the first regular expression by one of steps 206, 208 or 210, the first regular expression may be stored in a memory, e.g. in the regular expression database mentioned above. This may reduce an amount of processing required for subsequent analysis of documents. In particular, the first regular expression can be used again when analysing another document, without having to perform again the computationally expensive task of generating the first regular expression. In some cases, the regular expression code used in step 204 may correspond to a first regular expression for the product catalogue that was generated in a previous iteration of the method.

Figure 3:
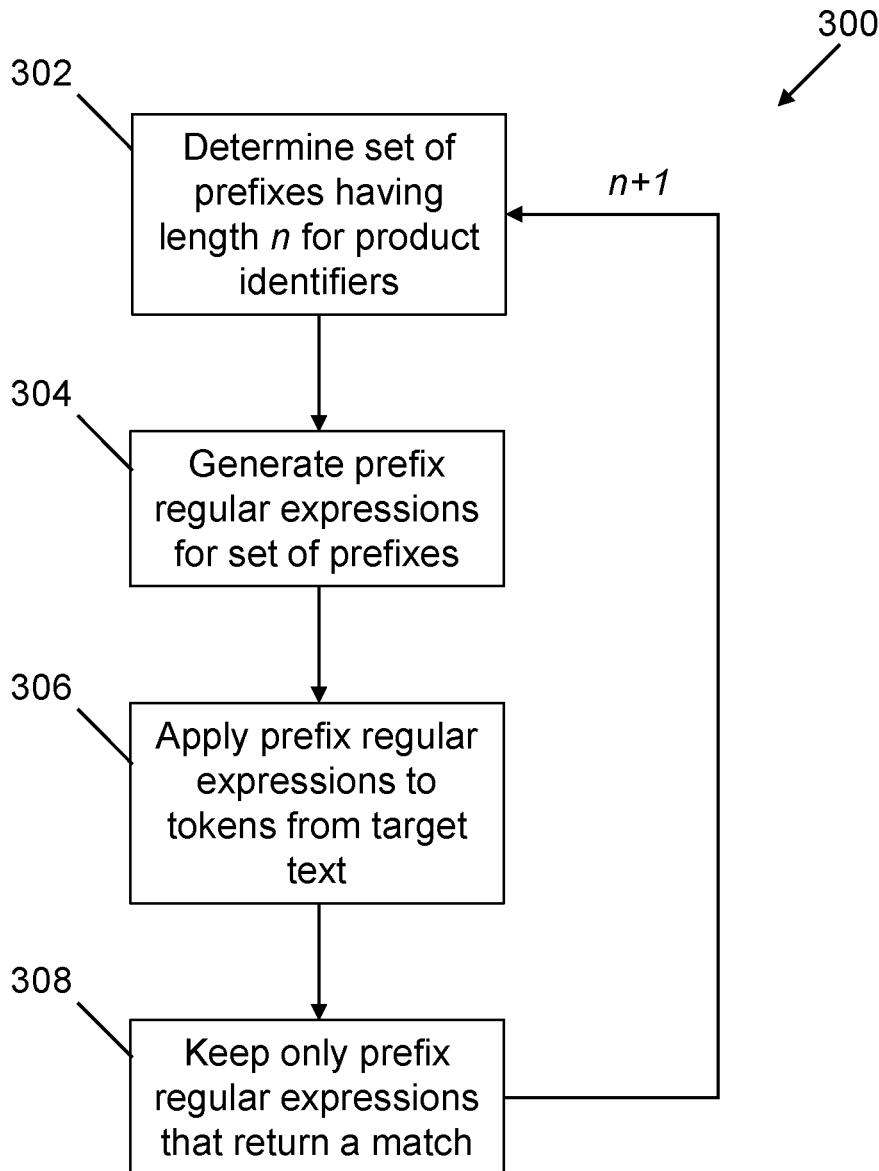
FIG. 3 is a schematic diagram illustrating a process that may be used as part of a method according to an embodiment of the invention.

FIG. 3 is a schematic diagram illustrating an example method 300 for implementing step 108 of the method 100 discussed above. Thus, the method 300 serves to determine if any of the tokens that were found to match the first regular expression as a result of step 106 correspond to a product identifier from the product catalogue.

The method 300 takes as an input the tokens which were found to match the first regular expression, i.e. strings of characters in the target text that were found to match the first regular expression. As shown in FIG. 3, the method 300 involves an iterative process. In a first step 302, the method 300 determines a set of prefixes of the product identifiers in the product catalogue, the prefixes having a predetermined length of n characters (where n is an integer). For example, in a first iteration, n may be set to 2. Then the set of prefixes may include all of the two-character prefixes for the product identifiers in the product catalogue.

At step 304, the method 300 then generates a respective prefix regular expression for each prefix in the set of prefixes determined in step 302. Each prefix regular expression is configured to match its corresponding n-character prefix. The prefix regular expression may be configured to require a word boundary before the prefix. This may serve to ensure that only prefixes starting at a word boundary are identified.

At step 306, the method 300 applies each of the prefix regular expressions to the tokens that were found to match the first regular expression as a result of step 106. Where there are multiple tokens, this may be done, for example, by combining the multiple tokens into a single string of characters, and applying in turn each prefix regular expression to the string of characters. The string of characters may include spaces between the tokens, i.e. so that there is a word boundary between each token. The prefix regular expression may be applied to the string of characters using a suitable search engine. When a prefix regular expression is applied to the tokens, the prefix regular expression will return a match if the tokens include the corresponding prefix.

At step 308, the method keeps only those prefix regular expressions which returned a match when applied to the tokens in step 306. The remaining, non-matching prefix regular expressions may be discarded.

The method 300 then returns to step 302, incrementing the number n by 1, and runs through steps 302-308 again. Thus, where n=2 in the first iteration of the method 300, n will be incremented to 3 in the next iteration, and so on. However, in iterations of step 302 after the first iteration, the set of prefixes is determined to only include prefixes that match the prefix regular expressions kept in step 308 in the previous iteration. Thus, as the iterative process of method 300 proceeds, the set of prefixes becomes progressively smaller, with the prefixes themselves increasing incrementally in length.

Figure 4:
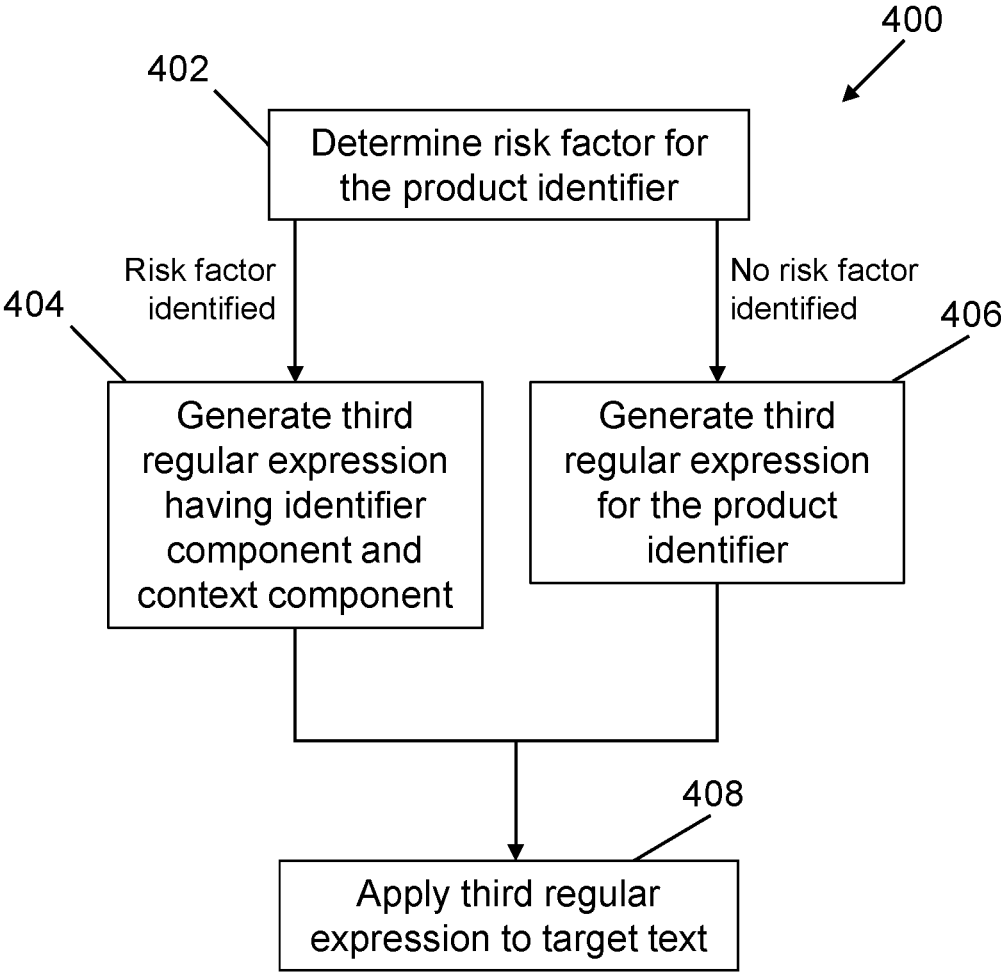
FIG. 4 is a schematic diagram illustrating a process that may be used as part of a method according to an embodiment of the invention.

The method 300 terminates when n reaches the length of the product identifiers in the product catalogue, i.e. when n can no longer be increased. In particular, if a prefix in the set of prefixes represents an entire product identifier (i.e. the prefix has the same number of characters as the product identifier), and the corresponding prefix regular expression matches one of the tokens in step 306, then that token may be determined to correspond to the product identifier. Accordingly, the method 300 may output product identifiers which are determined to correspond to tokens identified in the target text. The product identifiers output from the method 300 may be used for adding an entry in the citation database, as shown in step 110 of method 100. Alternatively, a further verification process may be performed to confirm that the product identifiers determined in method 300 are actually cited in the target text. This verification step serves to improve the accuracy of the method. FIG. 4 is a schematic diagram which illustrates a method 400 corresponding to such a verification process.

The method 400 is performed for each product identifier which is determined to correspond to a token from the target text. For example, the method 400 may be performed for each product identifier determined to correspond to a token from the target text following the method 300. In the following, each product identifier determined to correspond to a token from the target text (e.g. by method 300) may be referred to as a 'candidate' product identifier. In general terms, the method 400 involves, for each candidate product identifier, generating, using a suitably configured processor, a third regular expression for that product identifier, and applying the third regular expression to the target text to determine if the product identifier is indeed cited in the target text.

Starting at step 402, the method 400 determines a risk factor for one of the candidate product identifiers, the risk factor being associated with a risk of wrongly identifying the product identifier in the target text. The inventors have found that product identifiers having certain properties may be more prone to incorrect identification, e.g. because they may be confused with character strings in the target text which are not actually represent product identifiers. For example, where a product identifier is a numeric code, there may be a risk that it could be confused with a date or some other numeric value or code. As another example, the product identifier may be confused with a Uniform Resource Locator (URL), Digital Object Identifier (DOI), address, unit of measurement or other string of characters. Accordingly, in step 402, the method 400 checks the product identifier against a set of rules, to determine whether there is a risk of the product identifier being wrongly identified in the target text. The set of rules may be determined beforehand, e.g. by a human user.

If in step 402 a risk factor for the product identifier is identified based on the set of rules, then the method 400 moves on to step 404. In step 404, the third regular expression is generated such that it has two components: an identifier component and a context component. The identifier component corresponds to regular expression code that is configured to match the product identifier. The identifier component may be configured to match varying writing styles, without overly broadening the match. For instance, where the product identifier includes punctuation, the identifier component may be configured to match versions of the product identifier having alternate punctuations. As an example, if the product identifier is 'ab-1234', the identifier component may be configured to match each of 'ab1234', 'ab 1234' and 'ab-1234'. The context component is configured to match one or more predetermined character strings, adjacent to (e.g. preceding and/or following) a character string that is matched by the identifier component. The predetermined characters strings matched by the context component may correspond to any text that can be used for confirming that a string matching the identifier component is indeed a product identifier. For example, the predetermined character strings may include 'catalogue number', 'cat #', 'cat no.', 'product number' or similar. The predetermined character strings may also include text indicative of a pack size, as this may typically be located after mention of a product identifier. Accordingly, the third regular expression generated in step 404 is configured to match a string of characters having a first portion which matches a pattern of product identifier and context defined by the third regular expression. Thus, a match is only returned if a product identifier is cited in combination with a predetermined context. This may ensure that a string in the target text is not wrongly identified as a product identifier.

On the other hand, if in step 402 no risk factor is identified for the product identifier, then the method 400 moves on to step 406. As no risk factor was identified for the product identifier, then there may be no need to verify that the product identifier is cited in combination with a predetermined context. Thus, in step 406, the third regular expression is generated, whereby it is configured to match the relevant product identifier. In contrast to the third regular expression generated in step 404, the third regular expression generated in step 406 need not have a context component, e.g. it may only have the identifier component mentioned above. The third regular expression (generated either by step 404 or step 406) may be stored in a memory of the system for subsequent use, e.g. to avoid having to re-compute the third regular expression when other documents are analysed.

Once the third regular expression has been generated (either by step 404 or step 406), the method 400 moves on to step 408, where the third regular expression is applied to the target text. The third regular expression may be applied to the target text by a search engine, which is configured to search the target text for character strings matching the third regular expression. If a match in the target text is found, then it is determined that the candidate product identifier for which the third regular expression was generated is indeed cited in the target text. Accordingly, an entry for the product identifier may then be added automatically and without further human intervention, to the citation database, as in step 110, linking the product identifier with the document and target text. Alternatively, if no match is found in step 408, then no entry is made in the citation database for the product identifier.

It should be noted that not all embodiments involve the steps shown in FIG. 4. For example, in some cases, there may be no determination of a risk factor as in step 402, and the third regular expressions for all of the candidate product identifiers may be generated using the same technique. For example, the third regular expressions for all of the candidate product identifiers may include an identifier component and a context component, regardless of any risk factor. Alternatively, in some cases, no context component may be included in the third regular expressions for the candidate product identifiers.

Figure 5:
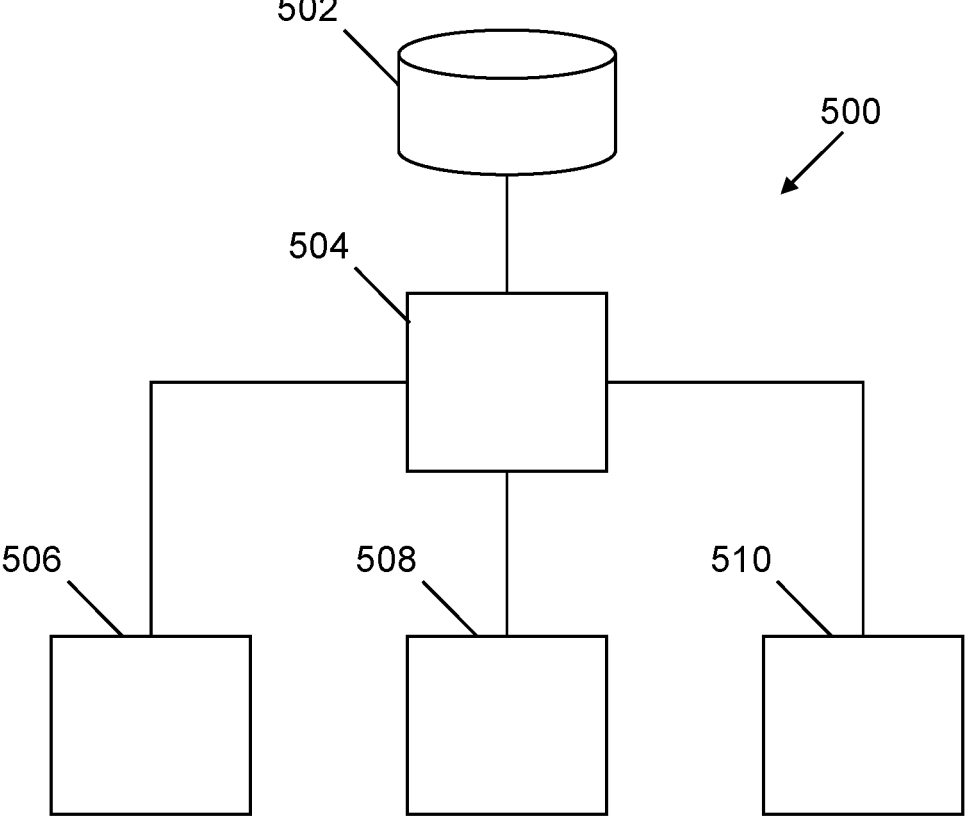
FIG. 5 is a schematic diagram of a computer-implemented system according to an embodiment of the invention.

FIG. 5 is a schematic diagram of a computer system 500 according to an embodiment of the invention. The system 500 is configured to carry out a method according to the invention, e.g. a method as described above with reference to FIGS. 1-4. The system 500 includes a storage medium 502 (e.g. non-volatile computer memory) coupled to a computer processor 504. The storage medium 502 stores computer instructions which, when executed by the processor 502, cause the processor to carry out a method according to the invention, e.g. the steps of method 100.

The processor 504 is further communicatively coupled to various databases, so that it can retrieve data from, and store data in, the databases. In particular, the processor 504 is coupled to a document database 506, a product catalogue database 508 and a citation database 510. The document database 506 is configured to store documents (e.g. journal articles). The processor 504 may access a document stored in the document database 506 to analyse the document according to the invention, i.e. to search the document for product identifiers. The product catalogue database 508 is configured to store product catalogues associated with one or more entities (e.g. manufacturers and/or suppliers), each product catalogue including a plurality of product identifiers. The citation database 510 is configured to store citations determined according to a method of the invention. In particular, the citation database may store entries linking product identifiers from the product catalogues stored in database 508, with documents stored in database 506. The processor 504 may further be coupled with a regular expression database (not shown) which may be configured to store regular expressions generated when analysing a document. For example, the regular expression database may store the first, second and third regular expressions generated as part of the analysis of a document, so that they can be accessed and re-used when analysing another document. The regular expression database may also store the regular expression codes discussed above.

In practice, the system 500 may be implemented by any suitable combination of computer systems and network of computer systems. For example, the computer system 500 and all databases may be implemented by a single computer system. Alternatively, the different tasks and functions of the system 500 may be distributed across one or more computer systems (e.g. servers).

In yet a further implementation of the methods, systems and apparatus described herein, a citation database is generated automatically. Using a suitably configured computing system comprising a processor and a memory for storing instructions, a corpus of documents is accessed and evaluated. Here, the suitably configured computing system searches for an entity identifier corresponding to an entity of interest within a document. For example, the entity of interest here is a product supplier. In one arrangement, the entity of interest is provided by one or more entity lists, files or databases are accessible to the computer system. Here, the computer system is configured to iterate through the entity list. However, in one or more implementations, the entity of interest is received from a user input. For example, a custom user supplied entity of interest, and associated product codes can be supplied.

Where an instance of the entity of interest is detected in a given document, the computer system is further configured to select a portion of the document around the instance of the entity identifier as a target text. In one or more configurations, the system is pre-configured to select n number of characters before and after the entity identified. As described herein, the entity is associated with a product catalogue. This product catalogue can be a data object, XML document, JSON file, linked list, database, array or other data structure accessible to the computer system described. In one arrangement, the product catalogue contains one or more product identifiers.

Here, the computer system is configured to automatically apply a first regular expression to the target text, wherein the first regular expression is configured to match one or more of the plurality of product identifiers. Where the product identifier is determined to be cited in the target text, the described computer system is configured to add the citation to an existing database file.

However, where there is no existing database file, the computer system is configured to generate a citation database file. For example, one or more submodules are used to configure the computing system to generate a database in a pre-determined file format. Once generated, the entry is added to the citation database linking the document and the product identifier. This process is then repeated for each entity identified within the given document and each product identifier. Furthermore, given that the computer system is executing over a corpus of documents, the described approach is then conducted on each document within the corpus of documents. Upon completion, a single database is constructed that includes each citation identified entity and product that is represented within the corpus of documents.

In yet a further implementation, a search engine is provided utilizing one or more of the citation databases described herein. For example, a search engine is provided that is configured to receive a search query for a given product. However, in alternative configurations, the search engine can receive an entity identifier, or a document title. The search engine is then configured to perform a search on a citation database.

In one or more implementations, the citation database over which the search is executed was generated according to the one or more of the approaches described herein.

When the search query is executed over the citation database, the search engine is configured to return one or more product identifiers from the citation database based on the search query, such as search query using entity of interest identifiers. In one arrangement, the one or more product identifiers are then ranked based on a number of documents linked with each product identifier in the citation database.

A series of worked examples is provided below, to illustrate how a method according to an embodiment of the invention may be implemented. In the below examples, we consider four example entities (companies): Abcam, Cell Signaling Technology, MilliporeSigma and Developmental Studies Hybridoma Bank. Table 1 below shows example product catalogues associated with each entity. In particular, Table 1 shows, for each entity, product identifiers listed in their product catalogue.

TABLE 1

| Example entities and product catalogues | |
| --- | --- |
| Entity | Product identifier |
| Abcam | ab123 |
| | ab134 |
| | ab245 |
| Cell Signaling Technology | 2040 |
| | 2050 |
| | 4060 |
| MilliporeSigma | P-1000 |
| | P-1050 |
| | 12345 |
| | 123ab |
| Developmental Studies Hybridoma Bank | C594.9B |
| | 132-250-1 |
| | MF20 |

Table 2 below shows information that may be stored for each entity. For example Table 2 shows, for each entity, other names which may be used to identify that entity. Table 2 also shows any regular expression codes that have been previously determined and stored for each entity. The regular expression codes may be determined by a human, and/or automatically generated using a regular expression generator taking the product catalogue as an input. The final column in Table 2 shows a regular expression code for a pack size suffix which may feature at the end of a product identifier from the corresponding entity, e.g. to indicate a pack size of the product.

TABLE 2

| Entity information | | | |
| --- | --- | --- | --- |
| Entity | Also Known As | Regular Expression code | Pack Size Suffix |
| Abcam | | ab[0-9]+ | |
| Cell Signaling Technology | CST | [0-9]{4,5} | [SL] |
| MilliporeSigma | Millipore, Sigma | [a-z]-[0-9]{4} | |
| Developmental Studies Hybridoma Bank | DSHB | | |

For each entity, the entity name in the first column of Table 2, together with the additional names in the second column of Table 2, may be taken as the entity identifiers for that entity. In order to search a document for each entity's entity identifiers, the regular expressions shown in Table 3 below may be generated. Each regular expression in Table 3 is configured to match all of the entity identifiers for the corresponding entity, surrounded by something that marks the start or end of a string of text. Additionally, in the regular expressions of Table 3, spaces are replaced with a permissive pattern that allows authors to use multiple spaces, tabs, hyphens, unicode dashes or other unexpected punctuation. In this manner, the regular expressions of Table 3 may match the entity identifiers, even when authors use different writing styles with regard to spacing and punctuation. The regular expressions of Table 3 correspond to the 'second' regular expressions discussed above. The regular expressions of Table 3 may be generated by a human, or automatically using a suitably configured regular expression generator.

TABLE 3

| Regular expressions for entity identifiers | |
| --- | --- |
| Entity | Regular Expression |
| Abcam | (?<match>Abcam) |
| Cell Signaling Technology | (?<match>Cell\W*Signaling\W*Technology|CST) |
| MilliporeSigma | (?<match>MilliporeSigma|Millipore|Sigma) |
| Developmental Studies Hybridoma Bank | (?<match>Developmental\W*Studies\W*Hybridoma\W*Bank|DSHB) |

EXAMPLE 1

In a first example, we consider a first document including the following example text:

Thank you to the lovely staff at Abcam for helping.
An earlier paragraph not about antibodies.
The antibodies were purchased from Abcam (ab123, ab134). We used mode ab99 on the microscope.
A later paragraph not about antibodies.

Applying method 100 to the first document, in step 102 the regular expressions in Table 3 for each entity are applied to the document, to search the document for entity identifiers corresponding to the four entities. With the example text shown above, the regular expression for Abcam will return a match.

In step 104, portions of the document including instances of the Abcam entity identifier are defined as target text. For example, paragraphs of text including instances of the Abcam entity identifier may be defined as target text.

As an example, step 104 may output data summarised in Table 4 below:

TABLE 4

| Example target text from first document | | |
| --- | --- | --- |
| Target text no. | Entity | Target text |
| 1 | Abcam | Thank you to the lovely staff at Abcam for helping. |
| 2 | Abcam | The antibodies were purchased from Abcam (ab123, ab134) . We used mode ab99 on the microscope. |

The method 100 then analyses each target text separately. Starting with target text 1, a first regular expression needs to be determined for the Abcam product catalogue. The method 200 is followed for this purpose. The method 200 checks if a regular expression code is available for the Abcam product catalogue (step 202). As shown in Table 2, there is a regular expression code available. The method 200 moves on to step 204 where it is checked if the regular expression code matches all of the product identifiers in Abcam's product catalogue. In this case, all of the product identifiers match the regular expression code, so the method 200 moves on to step 206 where the first regular expression is generated based on the regular expression code. As an example, the following first regular expression which includes the regular expression code for Abcam may be generated:

$$(?<=\W|^)(ab[0-9]+)(?=\W|\$) \qquad (1)$$

This first regular expression is stored (e.g. cached and/or stored in a regular expression database), so that it can be re-used later on.

Then, in step 106, the first regular expression (1) is applied to the target text 1 shown in Table 4. No matches are found, so the method moves on to analysing target text 2.

Accordingly, step 106 is performed again, this time applying the first regular expression (1) (which was previously stored) to the second target text. This returns three tokens from the target text: 'ab123', 'ab134' and 'ab99'. These tokens are combined into a single string with spaces between the tokens: 'ab123 ab134 ab99'.

Next, method 300 is used to determine if any of the tokens correspond to product identifiers from Abcam's product catalogue. Starting with n=2, in step 302 the method determines all of the 2-character prefixes for the product identifiers in Abcam's product catalogue: this is just 'ab'.

In step 304, a prefix regular expression is generated for the prefix 'ab'. For example, the prefix regular expression \Wab may be generated, which is configured to search for strings starting at a word boundary and having the prefix 'ab'. In step 306, the prefix regular expression \Wab is applied to the string of tokens 'ab123 ab134 ab99', and returns a match. Therefore, in step 308 the prefix regular expression \Wab is kept.

The method 300 then returns to step 302, incrementing n by 1, such that at step 302 all of the 3-character prefixes matching \Wab are determined: 'ab1', 'ab2'. In step 304, corresponding prefix regular expressions \Wab1 and \Wab2 are generated, and in step 306 they are applied to the string of tokens. \Wab1 returns a match, whilst \Wab2 does not return any match, such that at step 308 only \Wab1 is kept (\Wab2 can be discarded).

The method 300 then returns again to step 302, incrementing n by 1, such that at step 302 all of the 4-character prefixes matching \Wab1 are determined: 'ab12', 'ab13'. In step 304, corresponding prefix regular expressions \Wab12 and \Wab13 are generated, and in step 306 they are applied to the string of tokens. \Wab12 and \Wab13 both return a match, such that at step 308 both \Wab12 and \Wab13 are kept.

The method 300 then returns again to step 302, incrementing n by 1, such that at step 302 all of the 5-character prefixes matching either of \Wab12 and \Wab13 are determined: 'ab123', 'ab134'. In step 304, corresponding prefix regular expressions \Wab123 and \Wab134 are generated, and in step 306 they are applied to the string of tokens. \Wab123 and \Wab134 both return a match, such that at step 308 both \Wab123 and \Wab134 are kept.

When the method 300 returns again to step 302 and attempts to find 6-character prefixes, it is found that the maximum length of the product identifiers has already been reached, i.e. that the matched 5-character prefixes correspond to whole product identifiers. Accordingly, the prefix regular expressions \Wab123 and \Wab134 which provided a match in the latest iteration of step 308 correspond to matched product identifiers in the string of tokens. Therefore, the tokens ab123 and ab134 can be determined as product identifiers cited in target text 2.

To confirm that product identifiers ab123 and ab134 have been correctly identified in target text 2, method 400 is applied as a verification process. In step 402, no risk factor is determined for the product identifiers ab123 and ab134, e.g. because they do not have a format that could be confused with a date. In step 406, a third regular expression is generated for each of the product identifiers ab123 and ab134, examples of which are shown in Table 5 below.

TABLE 5

| Example third regular expressions | |
|---|---|
| Product identifier | Third regular expression |
| ab123 | (?<=(['\w\-]|\A))(?<match>ab123)(?=(['\w\-]|\z)) |
| ab134 | (?<=(['\w\-]|\A))(?<match>ab134)(?=(['\w\-]|\z)) |

The third regular expressions generated for these product identifiers may be stored in a memory so that they can be re-used at a later stage.

In step 408 each third regular expression shown in Table 5 is applied to target text 2. Both regular expressions return a match, meaning that product identifiers ab123 and ab134 are determined to be cited in target text 2.

Finally, in step 110, entries are automatically added to the citation database for product identifiers ab123 and ab134, linking them to the first document and target text 2.

EXAMPLE 2

In a second example, we consider a second document including the following example text:
We purchased Cat# 2050S from CST. It has a use by date of the year 2040.

Applying method 100 to the second document, in step 102 the regular expressions in Table 3 for each entity are applied to the document. With the example text shown above, the regular expression for CST will return a match, and in step 104 the following target text is determined:

TABLE 6

| Example target text from second document | | |
|---|---|---|
| Target text no. | Entity | Target text |
| 1 | CST | We purchased Cat# 2050S from CST. It has a use by date of the year 2040. |

A first regular expression is generated for the CST product catalogue, in accordance with the method 200. In step 202 the method finds the regular expression code associated with the CST product catalogue, and at step 204 determines that all of the product identifiers in the CST product catalogue match the regular expression code. Accordingly, at step 206 a first regular expression based on the stored regular expression code is generated. The first regular expression for the CST product catalogue may, for example, be:

$$(?<=\W')([0-9]\{4,5\})([SL])?(?=\W'\$) \qquad (2)$$

Note that, as there is a pack size suffix for the CST product catalogue (see Table 2), this is included in the first regular expression (2).

In step 106, the first regular expression (2) is applied to the target text 1 shown in Table 6. The following two tokens from the target text match the first regular expression (2): '2050S', '2040'. These tokens are combined into a single string with spaces between the tokens: '2050S 2040'.

Next, method 300 is used to determine if any of the tokens correspond to product identifiers from CST's product catalogue. Starting with n=2, in step 302 the method determines the set of the 2-character prefixes for the product identifiers in CST's product catalogue: ['20', '40']. In step 304, a prefix regular expression is generated for each prefix: \W20 and \W40. In step 306 the prefix regular expressions are applied to the target text 1 of Table 6, and \W20 returns a match, whilst \W40 does not return a match. Therefore, in step 308 the prefix regular expression \W20 is kept (\W40 can be discarded).

The method 300 then returns to step 302, incrementing n by 1, and at step 302 finds the set of 3-character prefixes matching \W20: ['204', '205']. In step 304, a prefix regular expression is generated for each prefix: \W204 and \W205. In step 306 the prefix regular expressions are applied to the target text, and both \W204 and \W205 return a match. Therefore, both \W204 and \W205 are kept in step 308.

The method 300 then returns again to step 302, incrementing n by 1, and at step 302 finds the set of 4-character prefixes matching either of \W204 and \W205: ['2040', '2050']. In step 304, a prefix regular expression is generated for each prefix: \W2040 and \W2050. In step 306 the prefix regular expressions are applied to the target text, and both \W2040 and \W2050 return a match. Therefore, both \W2040 and \W2050 are kept in step 308.

When the method 300 returns again to step 302 and attempts to find 5-character prefixes, it is found that the maximum length of the product identifiers has already been reached, i.e. that the matched 4-character prefixes correspond to whole product identifiers. Therefore, the tokens 2040 and 2050 can be determined as product identifiers cited in the target text.

To confirm that product identifiers 2040 and 2050 have been correctly identified in target text, method 400 is applied as a verification process. In step 402, it is determined that there is a risk factor for the product identifiers 2040 and 2050, as these could be confused with dates mentioned in the text. Therefore, the method 400 moves on to step 406 where the third regular expression is generated as having an identifier component and a context component. An example of such third regular expressions is provided in Table 7 below.

TABLE 7

Example third regular expressions

| Product identifier | Third regular expression |
|---|---|
| 2040 | (?<=([^\w\-]\|\A))(?<match>(#\|(num(ber)?\|cat(alog)?))\W*2040(?<suffix>[SL])?)(?=([^\w\-]\|\z)) |
| 2050 | (?<=([^\w\-]\|\A))(?<match>(#\|(num(ber)?\|cat(alog)?))\W*2050(?<suffix>[SL])?)(?=([^\w\-]\|\z)) |

The third regular expressions in Table 7 include a context component which requires corroborating text to confirm that a string '2040' or '2050' in the target text is in fact a product identifier. In particular, in the above third regular expressions the context component is configured to match strings of characters including '#', 'num', 'number', 'cat', 'catalog' which precede the string '2040'. Additionally, the context component includes a component corresponding to the pack size suffix that may be included in CST product identifiers. Of course, the context component may be configured to search for additional or alternative strings that can be used to confirm that a product identifier is being cited.

In step 408 each third regular expression shown in Table 7 is applied to the target text. In this case, only the third regular expression for product identifier 2050 returns a match. Finally, in step 110, an entry is automatically added to the citation database for product identifier 2050, linking it to the second document and the target text.

EXAMPLE 3

In a third example, we consider a third document including the following example text:

The mathematical value sigma was mentioned up here.

We purchased anti-ab 12345 from Millipore

Applying method 100 to the third document, in step 102 the regular expressions in Table 3 for each entity are applied to the document. With the example text shown above, the regular expression for MilliporeSigma will return a match, and in step 104 the following target texts determined:

TABLE 8

Example target text from third document

| Target text no. | Entity | Target text |
|---|---|---|
| 1 | MilliporeSigma | The mathematical value sigma was mentioned up here. |
| 2 | MilliporeSigma | We purchased anti-ab 12345 from Millipore |

A first regular expression is generated for the MilliporeSigma product catalogue, in accordance with the method 200. In step 202 the method finds the regular expression code associated with the MilliporeSigma product catalogue, and at step 204 determines that product identifiers 12345 and 123ab do not match the regular expression code. The method 200 then moves on to step 208, to generate the first regular expression having a first component and the second component. The first component is based on the retrieved regular expression code, whilst the second component is generated based on the non-matching product identifiers 12345 and 123ab. Various techniques may be used for generating the second component. For example, the second component could be generated simply by joining the non-matching product identifiers together, e.g. yielding /12345|123ab/. However, this approach can result in a very large string if there is a large number of non-matching product identifiers. Instead, a preferred technique is a regular expression generator which is configured to optimise the second component. This may be done, for example, by parsing the non-matching product identifiers into a tree, and then traversing the tree to obtain an optimised regular expression. As an example, this may yield the regular expression /123(45|ab)/. Combining the first component and the second component, the first regular expression for the MilliporeSigma product catalogue may be generated as:

$$(([a-z]\W*[0-9]\{4\})|(123(45|ab))) \qquad (3)$$

Note that in the first regular expression (3), the hyphen '-' is swapped for a more permissive pattern, to account for different writing styles.

In step 106, the first regular expression (3) is applied to the target text 1 shown in Table 8, and no match is returned. The method 100 then moves on to analysing target text 2, and applies the first regular expression to target text 2, which returns the following matching token: '12345'.

Next, method 300 is used to determine if the token corresponds to a product identifier from MilliporeSigma's product catalogue. Starting with n=2, in step 302 the method determines the set of the 2-character prefixes for the product identifiers in MilliporeSigma's product catalogue: ['P-', '12']. In step 304, a prefix regular expression is generated for each prefix: \WP\W* and \W12. In step 306 the prefix regular expressions are applied to the target text 2 of Table 8, and only \W12 returns a match. Therefore, in step 308 the prefix regular expression \W12 is kept (the other one can be discarded).

The method 300 then returns to step 302, incrementing n by 1, and at step 302 finds the set of 3-character prefixes matching \W12: ['123']. In step 304, a prefix regular expression is generated for the prefix: \W123. In step 306 the prefix regular expression is applied to the target text, and \W123 returns a match. Therefore, \W123 is kept in step 308.

The method 300 then returns again to step 302, incrementing n by 1, and at step 302 finds the set of 4-character prefixes matching \W123: ['1234', '123a']. In step 304, a prefix regular expression is generated for each prefix: \W1234 and \W123a. In step 306 the prefix regular expressions are applied to the target text, and only \W1234 returns a match. Therefore, only \W1234 is kept in step 308.

The method 300 then returns again to step 302, incrementing n by 1, and at step 302 finds the set of 5-character prefixes matching \W1234: ['12345']. In step 304, a prefix regular expression is generated for the prefix: \W12345. In step 306 the prefix regular expression is applied to the target text, and \W12345 returns a match. Therefore, \W12345 is kept in step 308.

When the method 300 returns again to step 302 and attempts to find 6-character prefixes, it is found that the maximum length of the product identifiers has already been reached, i.e. that the matched 5-character prefix corresponds to a whole product identifier. Therefore, the token 12345 can be determined as a product identifier cited in the target text.

To confirm that product identifier 12345 have been correctly identified in target text, method 400 is applied as a verification process. In step 402 it may be determined that the product identifier 12345 does not have any particular risk factor. For example, although it is a numeric code, it does not look like a date and so is unlikely to be confused with a date. Also, the product identifier 12345 is not divisible by 100, and so is unlikely to be confused with a dilution value or a standard measurement. Accordingly, the method 400 moves on to step 406 to generate the third regular expression.

As an example, the third regular expression may be generated in step 406 as shown in Table 9 below, where a context component is included as an optional requirement of the search pattern. In other words, a string of characters does not necessarily need to match the context component in order to match the third regular expression of Table 9.

TABLE 9

| Example third regular expressions | |
| --- | --- |
| Product identifier | Third regular expression |
| 12345 | (?<=([^\w\-]\|\A))(?<match>((#\|(num(ber)?\|cat(alog)?))\W*)?2345)(?=([^\w\-]\|\z)) |

In step 408 the third regular expression shown in Table 9 is applied to the target text 2 of Table 8, which returns a match. Finally, in step 110, an entry is added to the citation database for product identifier 12345, linking it to the third document and the target text 2.

EXAMPLE 4

In a fourth example, we consider a fourth document including the following example text:

This is a really long bit of text before we start talking about the antibody. The mouse monoclonal antibody MF20 supernatant was obtained from the Developmental Studies Hybridoma Bank. This is another really long bit of text after we talk about the antibody.

Applying method 100 to the fourth document, in step 102 the regular expressions in Table 3 for each entity are applied to the document. With the example text shown above, the regular expression for DSHB will return a match, and in step 104 the following target text determined (e.g. by determining a portion of text including a predetermined number of characters before and after the instance of the entity name):

TABLE 10

| Example target text from fourth document | | |
| --- | --- | --- |
| Target text no. | Entity | Target text |
| 1 | DSHB | really long bit of text before we start talking about the antibody. The mouse monoclonal antibody MF20 supernatant was obtained from the Developmental Studies Hybridoma Bank. This is another really |

In the case of the DSHB product catalogue, there is no stored regular expression code. Furthermore, the product identifiers from the DSHB product catalogue do not follow any particular character patterns, with the product identifiers in the DSHB product catalogue appearing unrelated to one another. Therefore, it may not be practical to generate a single first regular expression that covers the whole DSHB product catalogue, and instead at step 210 a respective first regular expression is generated for each product identifier in the product catalogue. Table 11 below shows examples of first regular expressions that may be generated for each of the product identifiers in the DSHB product catalogue.

TABLE 11

| Example first regular expressions | |
| --- | --- |
| Product identifier | First regular expression |
| C594.9B | (?<=([^\w\-]\|\A))(?<match>((#\|(num(ber)?\|cat(alog)?))\W*)?c594\.9b)(?=([^\w\-]\|\z)) |
| 132-250-1 | (?<=([^\w\-]\|\A))(?<match>((#\|(num(ber)?\|cat(alog)?))\W*)?132\W*250\W*1)(?=([^\w\-]\|\z)) |
| MF20 | (?<=([^\w\-]\|\A))(?<match>((#\|(num(ber)?\|cat(alog)?))\W*)?mf20)(?=([^\w\-]\|\z)) |

The first regular expressions in Table 11 are generated by looking up the product identifiers in the DSHB product catalogue, and providing them as an input to an automated regular expression generator. The regular expression generator is configured to generate a permissive first regular expression for each product identifier, to account for different writing styles as discussed above. Additionally, the first regular expressions are generated to include an optional context component, similar to that discussed above in relation to Example 3. The first regular expressions are then stored in a memory (e.g. in the regular expression database and/or a cache), so that they can be re-used at a later stage.

Then, in step 106, each first regular expression computed for the DSHB product identifiers is applied in turn to the target text in Table 10. In step 108, if a first regular expression returns a match, then the matched token is determined to correspond to a product identifier cited in the target text. In this case, only the first regular expression for the product identifier MF20 produces a match. Accordingly, in step 110 an entry is added to the citation database, linking the product identifier MF20 to the fourth document and the target text.

Note that the regular expressions disclosed in the examples above are for illustrative purposes, and various modifications to the regular expressions can be made. For example, if wanted, the regular expressions can be modified to make them case insensitive (e.g. by adding //i around a regular expression) or to otherwise make them more tolerant to different writing styles.

Although a few preferred embodiments have been shown and described, it will be appreciated by those skilled in the art that various changes and modifications might be made without departing from the scope of the invention, as defined in the appended claims.

All of the features disclosed in this specification (including any accompanying claims, abstract and drawings), and/or all of the steps of any method or process so disclosed, may be combined in any combination, except where at least some of such features and/or steps are mutually exclusive. In particular, various combinations of the methods 100, 200, 300 and 400 discussed above may be used.

Each feature disclosed in this specification (including any accompanying claims, abstract and drawings) may be replaced by alternative features serving the same, equivalent or similar purposes, unless expressly stated otherwise. Thus, unless expressly stated otherwise, each feature disclose is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A computer-implemented method for generating a citation database from a corpus of documents stored in a computer readable memory, wherein the corpus of documents includes at least ten million documents, the method comprising for each of the documents in the corpus of documents, by executing instructions stored on a processor readable media of at least one computing device:

searching, by the at least one computing device, the document for an entity identifier corresponding to an entity and, if an instance of the entity identifier is detected in the document, determining a portion of the document around the instance of the entity identifier as a target text, wherein the entity is associated with a product catalogue, the product catalogue comprising a plurality of product identifiers;

automatically applying, by the at least one computing device, a first regular expression to the target text, wherein the first regular expression is configured to match one or more of the product identifiers;

identifying, by the at least one computing device, one or more tokens from the target text that match the first regular expression; and determining, by the at least one computing device, if any of the one or more tokens corresponds to a product identifier from the product catalogue and, if so, which product identifier;

if a product identifier from the product catalogue is determined to be cited in the target text, automatically adding, by the at least one computing device, an entry to a citation database linking the document and the product identifier;

wherein determining if any of the one or more tokens corresponds to a product identifier comprises an iterative process, each iteration of the iterative process including:

determining a set of prefixes for the plurality of product identifiers, each prefix having a predetermined number of characters;

generating a set of prefix regular expressions corresponding to the set of prefixes;

applying the prefix regular expressions to the one or more tokens, and keeping only the prefix regular expressions that return a match;

wherein for each subsequent iteration, the predetermined number of characters is increased by one, and the set of prefixes is determined to include only prefixes that match a prefix regular expression kept in the previous iteration; and wherein, a token is determined to correspond to a product identifier if a prefix regular expression matches the token, and if the predetermined number of characters corresponds to a number of characters in the product identifier.

2. A method according to claim 1, wherein the searching for the entity identifier in the document comprises applying a second regular expression to the document.

3. A method according to claim 2, wherein there are multiple entity identifiers corresponding to the entity, and the second regular expression is configured to match all of the multiple entity identifiers.

4. A method according to claim 1, further comprising generating the first regular expression.

5. A method according to claim 4, wherein generating the first regular expression comprises obtaining, from a memory, by the at least one computing device, a regular expression code associated with the product catalogue, and basing a first component of the first regular expression on the obtained regular expression code.

6. A method according to claim 5 wherein the at least one product identifiers were determined to not match the regular expression code.

7. A method according to claim 4, wherein generating the first regular expression comprises generating, by the at least one computing device, using at least one of the plurality of product identifiers, a second component of the first regular expression, the second component being configured to match the at least one product identifiers.

8. A method according to claim 7 wherein generating the second component of the first regular expression comprises parsing by the at least one computing device, the at least one product identifiers into a tree, and the at least one computing device is configured for traversing the tree using a recursive walk algorithm to generate the second component.

9. A method according to claim 4, further comprising storing the first regular expression in a memory.

10. A method according to claim 1 further comprising, for each of the one or more tokens determined to correspond to a product identifier:

determining, by the at least one computing device, a risk factor for the corresponding product identifier, wherein the risk factor is associated with a risk of wrongly identifying the product identifier in the target text;

if a risk factor is determined by the at least one computing device, generating a third regular expression configured to match the corresponding product identifier, by the at least one computing device, wherein the third regular expression includes an identifier component configured to match the product identifier, and a context component that is configured to match a predetermined context;

applying, by at least one computing device, the third regular expression to the target text; and if a match with the third regular expression is found in the target text, determining, by the at least one computing device, that the corresponding product identifier is cited in the target text.

11. A method according to claim 10, wherein the third regular expression comprises an identifier component configured to match the product identifier, and a context component that is configured to match a predetermined context.

12. A method according to claim 1, wherein the first regular expression is configured to match all of the plurality of product identifiers.

13. A computer-implemented system comprising a processor and a memory storing instructions which, when executed by the processor, cause the processor to carry out the method of claim 1.

14. A computer-readable non-volatile storage medium comprising instructions stored therein which, when executed by a processor, cause the processor to carry out the method of claim 1.

15. The method according to claim 1, wherein the first regular expression is obtained by automatically generating, by the at least one computing device, at least a portion of the first regular expression by iterating over the plurality of product identifiers and constructing a regular expression that matches all of the product identifiers.

16. A computer-implemented method for generating a product citation database from a corpus of documents, the method comprising:

searching, by at least one processor configured by code, for each electronically accessible document within the corpus of documents, for an entity identifier corresponding to an entity and, if an instance of the entity identifier is detected in the document, determining, by at least one processor configured by code, a portion of the document around the instance of the entity identifier as a target text, wherein the entity is associated with a product catalogue, the product catalogue comprising a plurality of product identifiers;

identifying, by the at least one processor, a risk factor associated with a product identifier in the document, wherein the risk factor indicates a likelihood of the product identifier being identified in the document is a false positive in the target text;

generating, by the at least one processor, a first regular expression that includes: (i) an identifier component matching the product identifier; and (ii) a context component matching a predetermined character string adjacent to the identifier component, wherein the context component is obtained by retrieving the context component from a database of a plurality of context components;

automatically applying the first regular expression to the target text by at least one processor configured by code, wherein the first regular expression is configured to match one or more of the plurality of product identifiers using the identifier component and the context component; and if a product identifier from the plurality of product identifiers is determined to be cited in the target text;

generating a citation database file by at least one processor configured by code, where the citation database does not exist; and adding an entry to the citation database by at least one processor configured by code, linking the document and the product identifier.

17. A computer-implemented method for searching content within a database, the method operating within a processor configured by code comprising:

receiving a search query for a product, performing a search on the citation database wherein the citation database was generated by the method of claim 16, and returning one or more product identifiers from the citation database based on the search query, wherein the one or more product identifiers are ranked based on a number of documents linked with each product identifier in the citation database.

* * * * *